(12) United States Patent
Böhm et al.

(10) Patent No.: US 9,774,214 B2
(45) Date of Patent: Sep. 26, 2017

(54) POWER SUPPLY AND METHOD FOR OPERATING THE POWER SUPPLY

(75) Inventors: Wolfgang Böhm, Niederoesterreich (AT); Harald Schweigert, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 615 days.

(21) Appl. No.: 13/700,885

(22) PCT Filed: May 5, 2011

(86) PCT No.: PCT/EP2011/057173
§ 371 (c)(1),
(2), (4) Date: Nov. 29, 2012

(87) PCT Pub. No.: WO2011/151124
PCT Pub. Date: Dec. 8, 2011

(65) Prior Publication Data
US 2013/0119765 A1 May 16, 2013

(30) Foreign Application Priority Data
Jun. 1, 2010 (AT) .................................. A 885/2010

(51) Int. Cl.
*H02J 7/34* (2006.01)
*H02J 7/00* (2006.01)
*H02J 9/06* (2006.01)

(52) U.S. Cl.
CPC ............. *H02J 7/34* (2013.01); *H02J 7/0031* (2013.01); *H02J 9/061* (2013.01); *H02J 2007/004* (2013.01); *Y10T 307/527* (2015.04)

(58) Field of Classification Search
CPC ....................................................... H02J 7/0031
(Continued)

(56) References Cited

U.S. PATENT DOCUMENTS 3,828,278 A * 8/1974 Rees ......................... G04F 5/06
327/437
4,672,293 A 6/1987 Crampton
(Continued)

FOREIGN PATENT DOCUMENTS

CN 1449085 10/2003
CN 1574543 2/2005
(Continued)

OTHER PUBLICATIONS

Office Action dated May 27, 2014 issued in the corresponding Chinese Patent Application No. 201180027045.2.

*Primary Examiner* — Thienvu Tran
*Assistant Examiner* — Tien Mai
(74) *Attorney, Agent, or Firm* — Cozen O'Connor

(57) ABSTRACT

A power supply, a controller, and a power element, wherein a DC compensation voltage is present at a first output of the power element to which a load having a variable current draw can be connected. A second output of the power element is thereby fed through a current measurement device, wherein a rechargeable battery is connected to the second output. A charging current or discharge current of the rechargeable battery measured by the current measuring device is set by controlling the DC compensating voltage. The charging current or discharge current of the rechargeable battery can thereby be determined even without a dedicated UPS assembly.

11 Claims, 6 Drawing Sheets

(58) Field of Classification Search
USPC .......................................................... 307/64
See application file for complete search history.

(56) References Cited

U.S. PATENT DOCUMENTS

| | | | |
|---|---|---|---|
| 5,254,930 A | | 10/1993 | Daly |
| 5,391,927 A | | 2/1995 | Kaziwara |
| 5,528,149 A | * | 6/1996 | Chen .............................. 324/433 |
| 5,801,514 A | * | 9/1998 | Saeki et al. .................... 320/136 |
| 6,977,448 B2 | * | 12/2005 | Kanouda et al. ............... 307/66 |
| 2004/0257029 A1 | * | 12/2004 | Sakamoto et al. ............ 318/802 |
| 2010/0072949 A1 | * | 3/2010 | Kumashiro ........... H02J 7/0086 320/134 |

FOREIGN PATENT DOCUMENTS

| | | |
|---|---|---|
| DE | 3410684 | 10/1985 |
| DE | 4435005 | 4/1996 |
| EP | 1465319 | 10/2004 |
| JP | 7194027 | 7/1995 |
| WO | WO 9413057 | 6/1994 |
| WO | WO 2009125265 | 10/2009 |

* cited by examiner

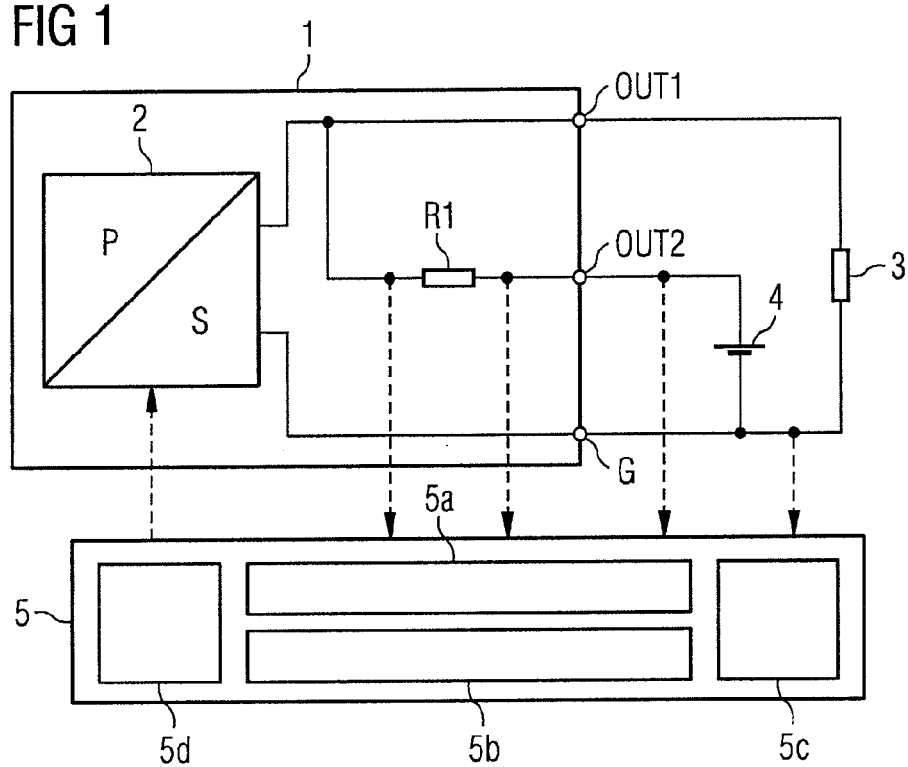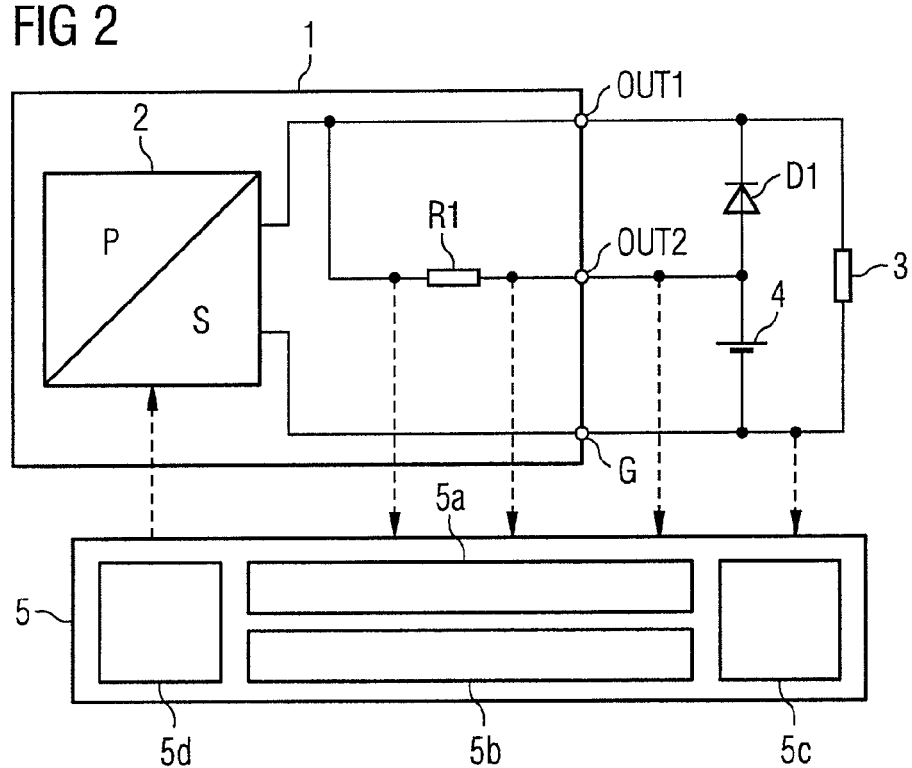

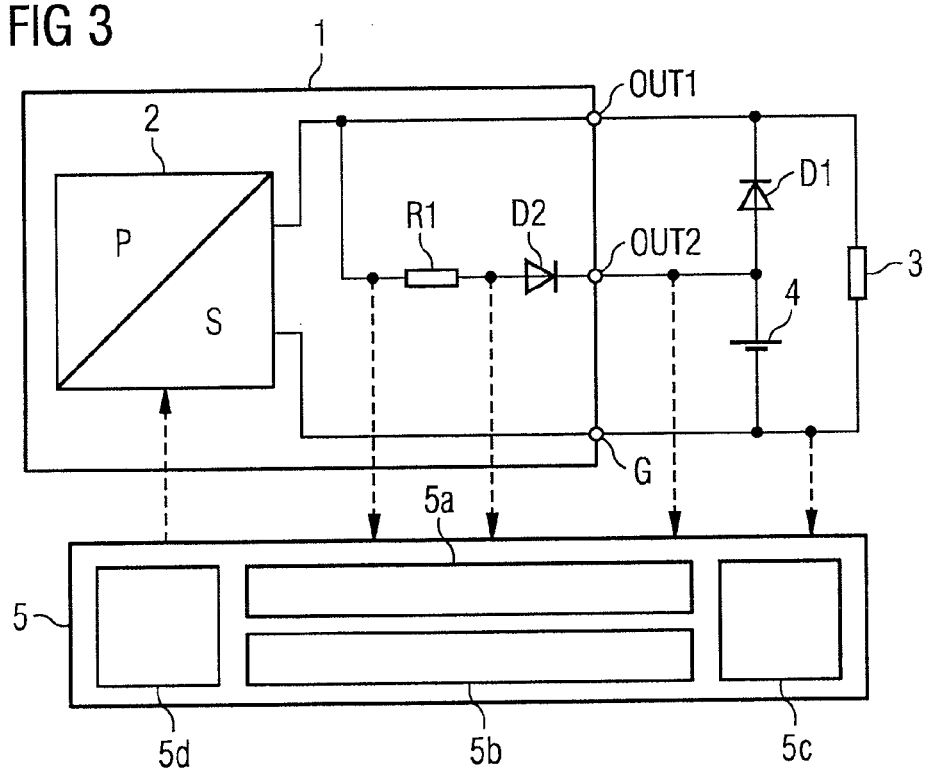
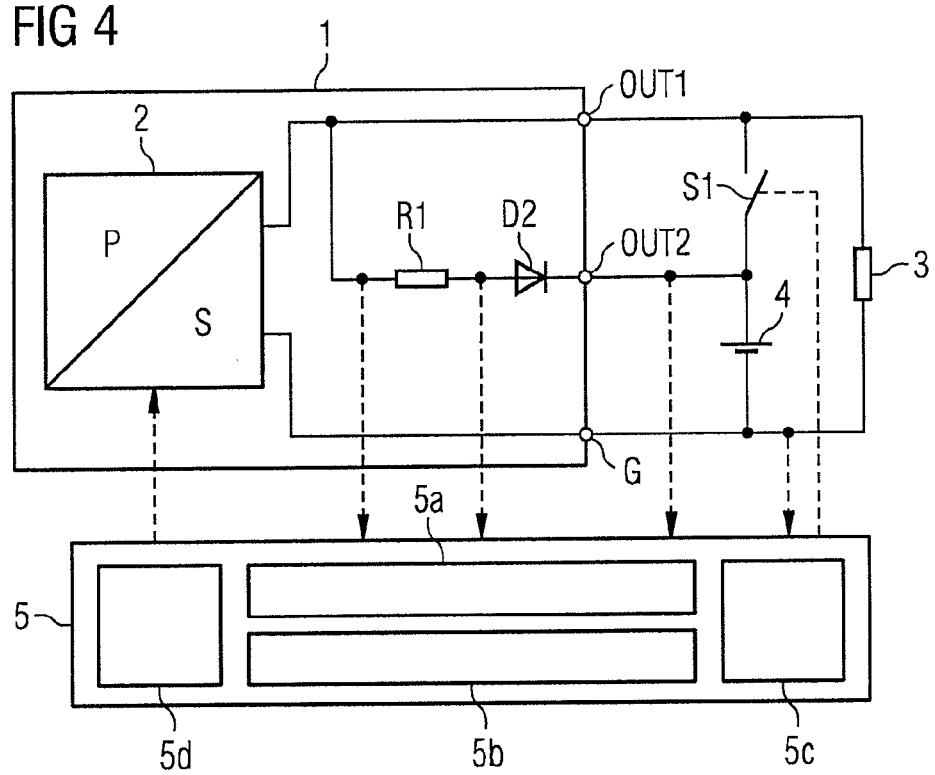

POWER SUPPLY AND METHOD FOR OPERATING THE POWER SUPPLY

CROSS-REFERENCE TO RELATED APPLICATIONS

This is a U.S. national stage of application No. PCT/EP2011/057173 filed 5 May 2011. Priority is claimed on Austrian Application No. A885/2010 filed 1 Jun. 2010, the content of which is incorporated herein by reference in its entirety.

BACKGROUND OF THE INVENTION

1. Field of the Invention

The invention relates to a power supply, including a controller and a power element, wherein a DC compensation voltage is present at a first output of the power element, to which a load having a variable current draw can be connected.

2. Description of the Related Art

The situation frequently arises, particularly in industrial systems, whereby a load is supplied by a power supply and in the process draws power that is not predetermined. A mains power supply network, to which the power supply is connected, generally is not fully protected against failure. Different measures are therefore known in order, in the event of mains failure, to ensure further supply of the load for a certain period of time. This is above all the case in safety-relevant applications. One example includes cable cars and chairlifts, which according to various regulations require a battery back-up, in order to maintain a control voltage (in most instances 24V) for the emergency supply of signals as well as control and communications facilities.

Rechargeable back-up batteries used in such systems should achieve as long a service life as possible to keep the maintenance outlay of a system low. With such rechargeable batteries, attention is therefore paid if necessary to a gentle charging and discharging process and to a protection against rechargeable battery deep discharge.

This is taken into account for instance with the use of an uninterruptable power supply system (UPS system) for a DC voltage, where a rechargeable back-up battery is operated by a charge controller and switched off in the event of deep discharge. With such systems, the load is in most instances supplied with the nominal output voltage of the power supply. Only in an emergency situation will the load be switched to the, in most instances, higher voltage of the charged rechargeable battery.

A UPS system represents a comprehensive solution, because the rechargeable battery can be charged with an attuned and optimized charging current characteristic by the charge controller, without the load being influenced. At the same time, this method is very complicated, since a dedicated UPS assembly is in most cases required in addition to the power supply.

Solutions without a dedicated UPS assembly are therefore also known. In such solutions, the power supply is selected such that there is the possibility to limit the output current to a defined value above the nominal current. A rechargeable back-up battery is directly connected to the output of such a power supply by way of a fuse or a cut-out, i.e., in parallel to the connected load. In the event of a mains outage, the rechargeable battery directly takes over the supply of the load.

The output voltage of the power supply is set such that it corresponds to the end-of-charge voltage of the rechargeable battery. Provided the rechargeable battery is not completely charged, the power supply is operated at its power limit. The difference between the consumption of the load and the power limit is routed into the rechargeable battery as a charging current. A controlled charge is not possible here. The load is operated with the end-of-charge voltage after charging the rechargeable battery. This is nevertheless generally unproblematic on account of an adequate tolerance of the supply voltage range of the load (at least at 24V consumers).

Aside from the uncontrollable charging current already mentioned, there is a further disadvantage in that, with an intentional deactivation of the system, the rechargeable battery also always has to be separately disconnected. Otherwise, there is the risk of a deep discharge involving damage to the rechargeable battery resulting therefrom.

SUMMARY OF THE INVENTION

It is therefore an object of the invention to provide an improved power supply to which a load having a valuable current draw can be connected.

This and other objects and advantages are achieved in accordance with the invention by providing a power supply in which a second output of the power element is fed through a current measuring apparatus, a rechargeable battery is connected to the second output, and a charging current or discharging current of the rechargeable battery measured by a current measuring apparatus is set by controlling the DC compensation voltage. As a result, the charging current or the discharging current of the rechargeable battery can also be determined without a dedicated UPS assembly. The rechargeable battery and the load to be supplied are connected to just one power element.

The main difference from known power supplies is that no dedicated output voltage is controlled for the rechargeable battery. The readily available DC compensation voltage is varied to supply a load, in order thus to set the charging current or discharging current of the rechargeable battery or to adjust the charging current or discharging current to a predetermined value.

During the charging process, the charging current is measured by the current measuring apparatus and the DC compensation voltage is changed such that the charging current corresponds to a predetermined value. A current characteristic curve is produced for the charging current caused by an internal resistance of the rechargeable battery. This provides for accurate control of the charging current by variation of the output voltage. The load voltage fluctuates here with the rechargeable battery charge voltage, which nevertheless plays no role on account of the tolerances of the connected load. The arrangement dispenses with a charge controller circuit and nevertheless allows for a controlled charge of the rechargeable battery.

In the simplest instance, the DC compensation voltage is fed through the current measuring apparatus to the second output. The second output is discharged as a current circuit from an output terminal of the power supply by the current measuring apparatus. Alternatively, the charge circuit can also already branch out from the output terminal or include a dedicated secondary-side auxiliary winding of a transformer. In the latter case, a fixed coupling exists between this auxiliary winding and a secondary-side main winding. An actuator and a pulse width modulator are therefore also required here for instance.

The load is advantageously connected to the rechargeable battery by means of a first switch or a first diode. This first diode or this first switch easily prevent the charging current from flowing directly further into the load. The first switch is only switched on during back-up mode.

In an advantageous embodiment, the switch comprises a power MOSFET.

In a further embodiment, the current measuring apparatus includes a shunt resistor and is connected to the controller. As an alternative, the current measuring apparatus comprises a current converter and is connected to the controller.

In order to protect the rechargeable battery from deep discharge, provision is made in a further embodiment for a second switch in the rechargeable battery line. An imminent deep discharge is identified by a secondary-side electronics system in the power supply and the second switch is switched off by the controller. Here, the secondary-side electronics system is furthermore supplied during emergency operation by the rechargeable battery via the load circuit and the output voltage terminals.

In a further embodiment, a further switch or a second diode is arranged in a charge current line, via which the rechargeable battery is charged. During back-up mode, the further switch prevents energy from flowing back out of the rechargeable battery into the power supply by deactivation by the controller and/or the second diode by blockage. The entire current therefore flows out of the rechargeable battery into the load. This is above all important if the rechargeable battery is not to be provided with a voltage source for a specific period of time. If for instance a charging specification renders necessary a complete flow switch from the power supply, the further switch is in this instance switched off by a controller. In the other instance, the output voltage is marginally reduced by the controller, and the second diode decouples the rechargeable battery from the power supply.

The power supply advantageously includes a microcontroller which is easily set up to implement the control tasks.

It is also an object of the invention to provide a method for operating a power supply in which the DC compensation voltage is lowered for a predetermined period of time by the controller, so that the load is supplied by the rechargeable battery for this predetermined period of time. This is used for instance to determine the remaining service life of the rechargeable battery or the charge state. Furthermore, wanted pulse charges and short discharge cycles are realized to extend the service life. This is particularly important in lithium ion rechargeable batteries because these rechargeable batteries become defective in the event of a longer standby operation without discharge. Internal chemical reactions can only be prevented by occasionally larger current flows.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained by way of example below with reference to the appended figures, in which:

FIG. 1 is a schematic illustration of a basic circuit in accordance with the invention;

FIG. 2 is a schematic illustration of a circuit with a first diode in accordance with the invention;

FIG. 3 is a schematic illustration of a circuit with a first and second diode in accordance with the invention;

FIG. 4 is a schematic illustration of a circuit with a deep discharge protection in accordance with the invention;

DETAILED DESCRIPTION OF THE PREFERRED EMBODIMENTS

Figure 5:
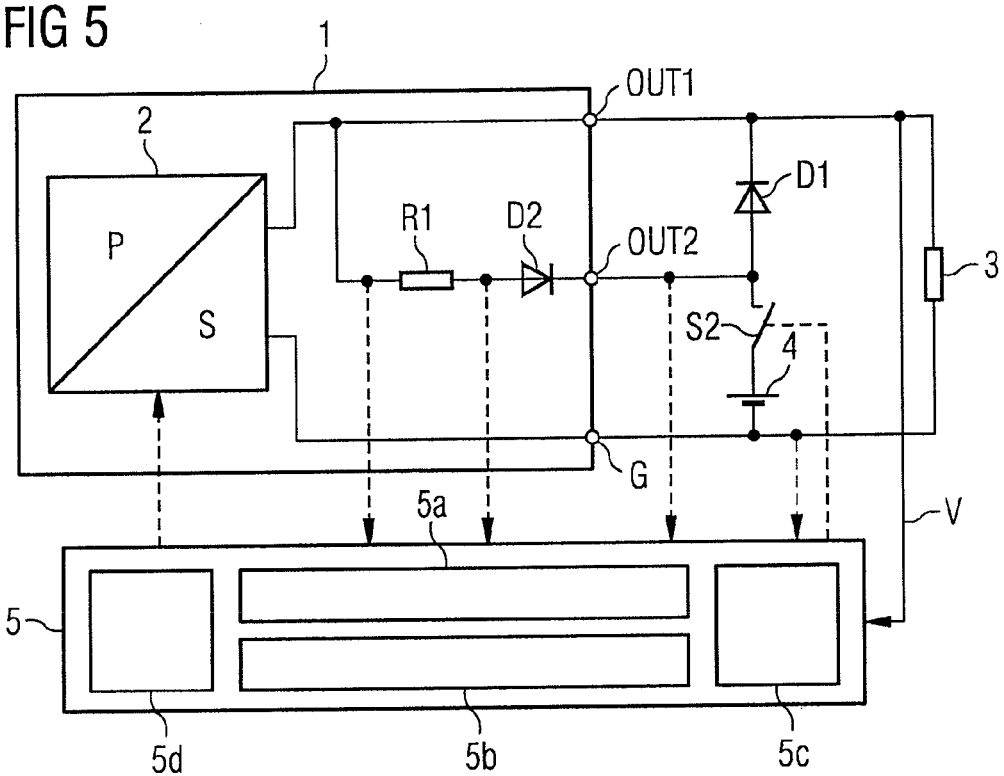
FIG. 5 is a schematic illustration of a circuit with a first diode and an additional second switch in accordance with the invention.

The power supply shown in FIG. 1 includes a power element 1 and a controller 5. A converter 2 of the power element 1 has a primary side P, which can be connected to a mains power supply. A DC compensation voltage $U_L$ related to a reference potential G is present at a first output OUT1 of a secondary side S of the converter 2. A load 3 is connected hereto. In preferred embodiments, the controller 5 is a microcontroller.

In accordance with the invention, the DC compensation voltage $U_L$ is fed through a current measuring apparatus to a second output OUT2.

In FIG. 1, this current measuring apparatus includes a shunt resistor R1. A current converter forms an alternative to this. The charging current is measured by a charging current measuring unit 5a of the controller 5 by detecting the voltage drop at the shunt resistor R1, indicated in the figure by dotted arrows. Similarly, the DC compensation voltage $U_L$ is continuously measured by an output voltage measuring unit 5b of the controller 5.

A rechargeable battery 4 is connected between the second output OUT2 and the reference potential G. The rechargeable battery voltage $U_A$ is measured by a rechargeable battery voltage measuring unit 5c of the controller 5. In order to adjust a desired charging current $I_L$ or discharging current, the DC compensation voltage $U_L$ is influenced by the controller 5. The controller 5 for this purpose includes an influencing unit 5d, which conveys corresponding control signals to an output voltage controller (not shown) of the power supply.

An increased desired value is predetermined to the output voltage controller by the controller 5, for instance, if a drop in the charging current $I_L$ is identified. If the charging current $I_L$ increases by contrast, because the load 3 absorbs less energy, for instance, a reduced desired value is predetermined to the output voltage controller.

A simple control is thus realized, where the charging current $I_L$ is controlled to a desired value by way of influencing the output voltage controller.

In the case of a desired discharge of the rechargeable battery 4, the DC compensation voltage is reduced by the controller 5 to such a degree that the desired discharging current flows out of the rechargeable battery 4 into the load 3.

A number of rechargeable batteries 4 can also be operated with the solution shown. Different charge and discharge characteristics per rechargeable battery 4 can be realized by way of several current measuring apparatuses and further outputs.

The arrangement in FIG. 2 corresponds essentially to that in FIG. 1 with the difference that a first diode D1 is arranged between the second output OUT2 and the load 3. The anode is connected to the second output OUT2, so that current flows out of the rechargeable battery 4 into the load 3, once the DC compensation voltage $U_L$ drops below the rechargeable battery voltage $U_A$.

A second diode D2 is arranged in FIG. 3 in the charging current line of the rechargeable battery 4, where this is permeable for a charging current $I_L$ from a power element 1 into the rechargeable battery 4 and blocks in the counter direction. This prevents energy from flowing back out of the rechargeable battery 4 into the power element 1 and/or through the current measuring apparatus during back-up mode. As an alternative to the second diode D2, a further switch can be used, which is switched off by the controller during back-up mode and in this way interrupts the charging current line.

An embodiment of a circuit for a deep discharge of the rechargeable battery 4 is shown in FIG. 4. The first diode shown in FIGS. 2 and 3 is replaced here by a first switch S1, which is controlled by the controller 5. If the supply by the power element 1 is absent, the controller 5 is further supplied by the rechargeable battery 4. The first switch S1 can therefore be controlled by the controller 5 with a switched-off power element 1. Once the rechargeable battery voltage $U_A$ reaches an impermissible value during back-up mode and the risk of a deep discharge exists, the controller 5 switches off the first switch S1 and in this way interrupts the connection between rechargeable battery 4 and load 3.

Another embodiment of a circuit with deep discharge protection is shown in FIG. 5. A first diode D1 is again arranged instead of a first switch S1 and a second switch S2 is provided immediately before the rechargeable battery 4, controlled by the controller 5. A power supply V is also provided for the controller 5 by the first output OUT1.

During back-up mode, the rechargeable battery 4 is switched to no load by switching off the second switch S2 and is thus protected against deep discharge.

Figure 6:
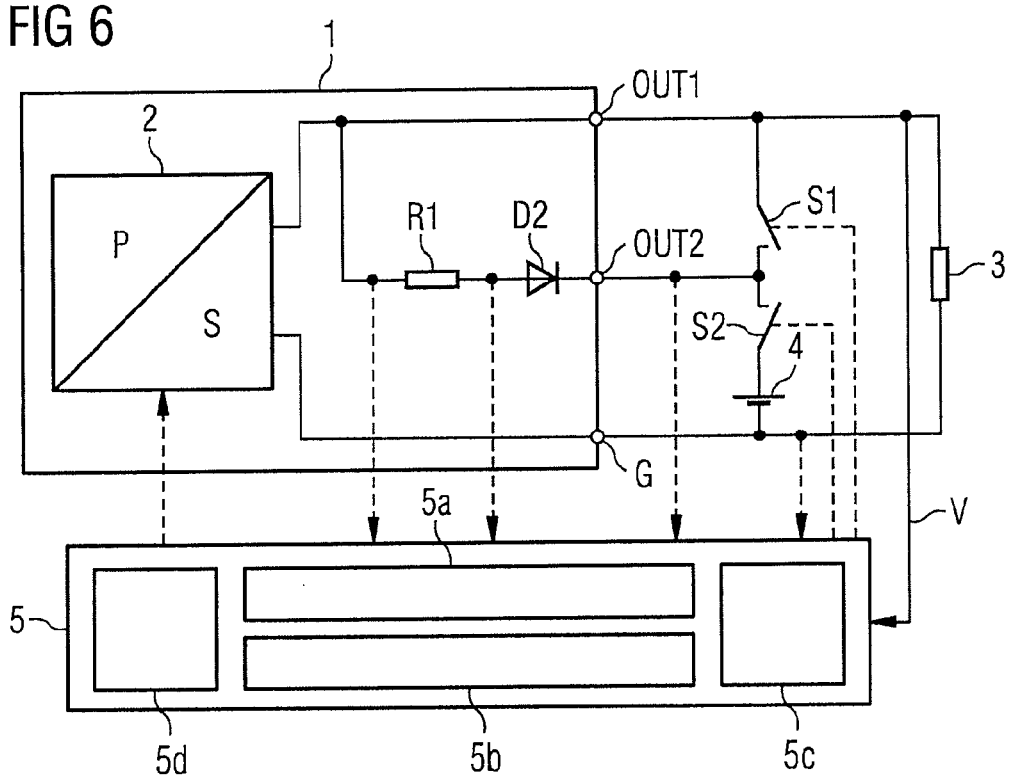
FIG. 6 is a schematic illustration of a circuit with a deep discharge protection and an additional second switch in accordance with the invention.

The embodiment of the circuit shown in FIG. 6 essentially corresponds to that in FIG. 5. Nevertheless, the first diode D1 is replaced by a first switch S1 which can be controlled by the controller 5.

Figure 7:
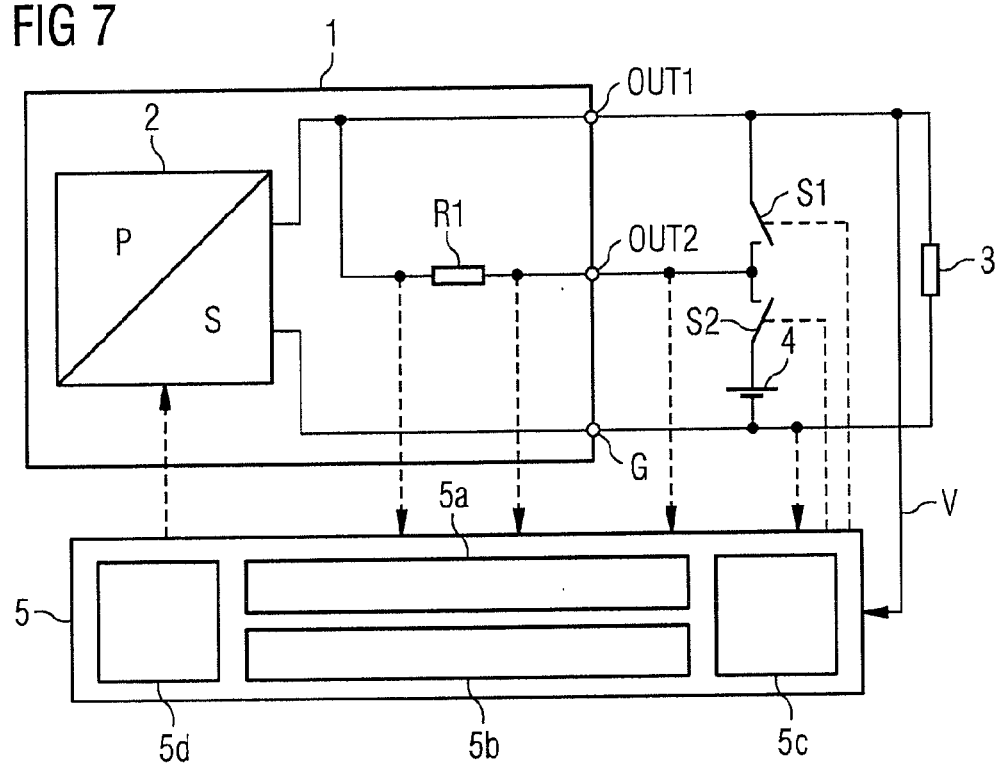
FIG. 7 is a schematic illustration of a circuit with a deep discharge protection, additional second switch and bridged second diode in accordance with the invention.

The circuit shown in FIG. 7 corresponds essentially to that in FIG. 6, nevertheless the second diode D2 is bridged here (i.e., removed). An open first switch S1 and closed second switch S2 provides the option of a targeted battery charge and discharge by varying the output voltage at the first output OUT1. Such a rechargeable battery conditioning sets optimized charge and discharge pulses to extend the service life of the rechargeable battery 4. Here, the actual rechargeable battery current is measured by the current measuring apparatus. During back-up mode, the first switch S1 can be closed to discharge the current measuring apparatus. This circuit also offers a deep discharge protection, by the second switch S2 being opened.

Figure 8:
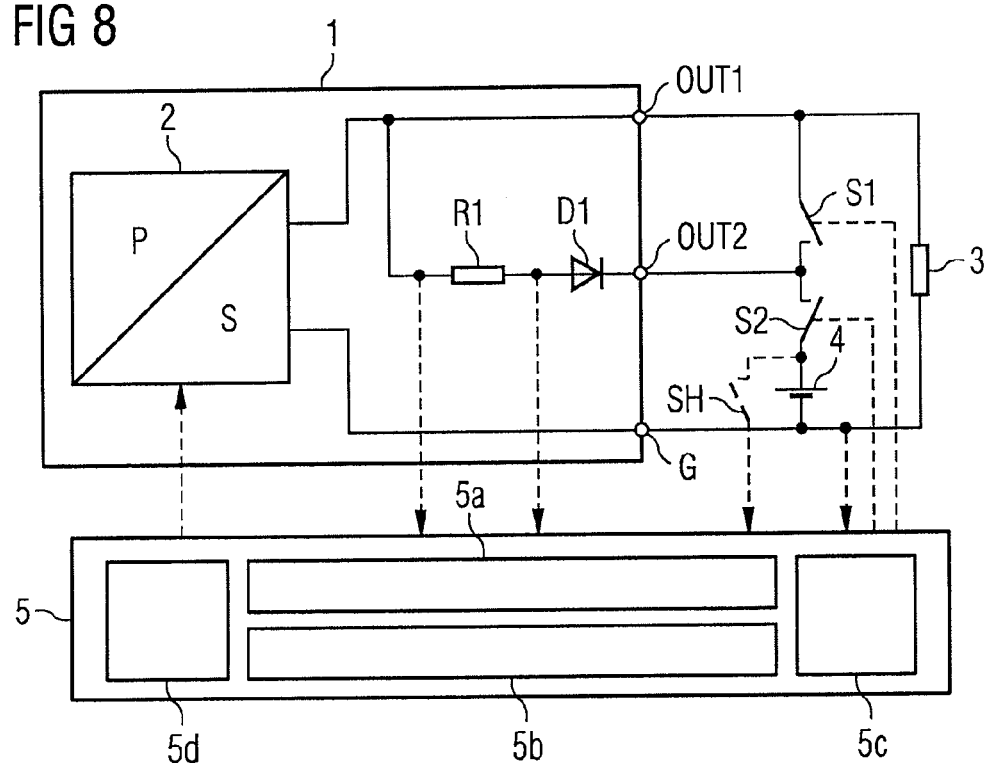
FIG. 8 is a schematic illustration of a circuit with a switch for separating the rechargeable battery in accordance with the invention.

A further embodiment of a circuit with a second switch S2 for protection against deep discharge is shown in FIG. 8. Furthermore, an auxiliary switch SH is arranged, which enables complete separation of the controller 5 from the rechargeable battery 4. This means that the rechargeable battery 4 is not discharged by the voltage splitter of the rechargeable battery voltage measuring unit 5c during a longer period of interruption. The rechargeable battery 4 is therefore disconnected from all possible consumers.

Figure 9:
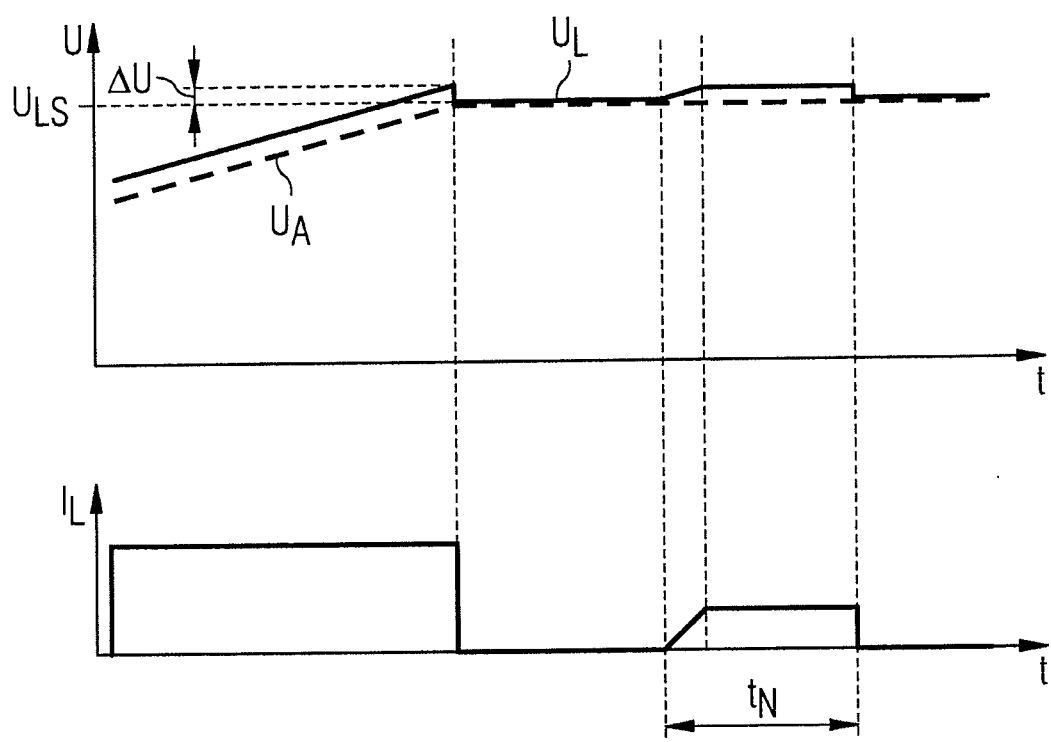
FIG. 9 is a graphical plot of voltage curves.

Examples of graphical plots of DC compensation voltage curves (=load voltage) $U_L$, of the rechargeable battery voltage $U_A$ and of the charging current $I_L$ over time t are shown in FIG. 9.

In a first phase, the rechargeable battery 4 is charged with a constant charging current $I_L$. Here, the DC compensation voltage $U_L$ is marginally above the rechargeable battery voltage $U_A$. The difference is given by the voltage drop $\Delta U$ at the current measuring apparatus.

Once an end-of-charge voltage $U_{LS}$ of the rechargeable battery 4 is reached, the flow of the charging current stops. The rechargeable battery voltage $U_A$ corresponds to the DC compensation voltage $U_L$. In order to compensate for the self-discharge processes, it is generally necessary to recharge the rechargeable battery 4 at intervals even without intermediate back-up mode. During a recharge time $t_N$, the DC compensation voltage $U_L$ is raised for this purpose, in order to induce a charging current $I_L$.

It may sometimes also be necessary, without back-up mode, to implement a brief discharge of the rechargeable battery 4 at intervals. This is necessary for instance with lithium ion rechargeable batteries or to determine a remaining service life or a charge state. To this end, the DC compensation voltage $U_L$ is not raised, but is instead lowered to below the rechargeable battery voltage $U_A$. A current flow is then produced from the rechargeable battery 4 through the load circuit.

In order to be able to make a statement about the remaining service life of the rechargeable battery, the voltage curve is tested during the loading process. To this end, a test load is connected to the rechargeable battery at predetermined time intervals, and a brief load is effected or the load current flowing at the time is used as a load.

Figure 10:
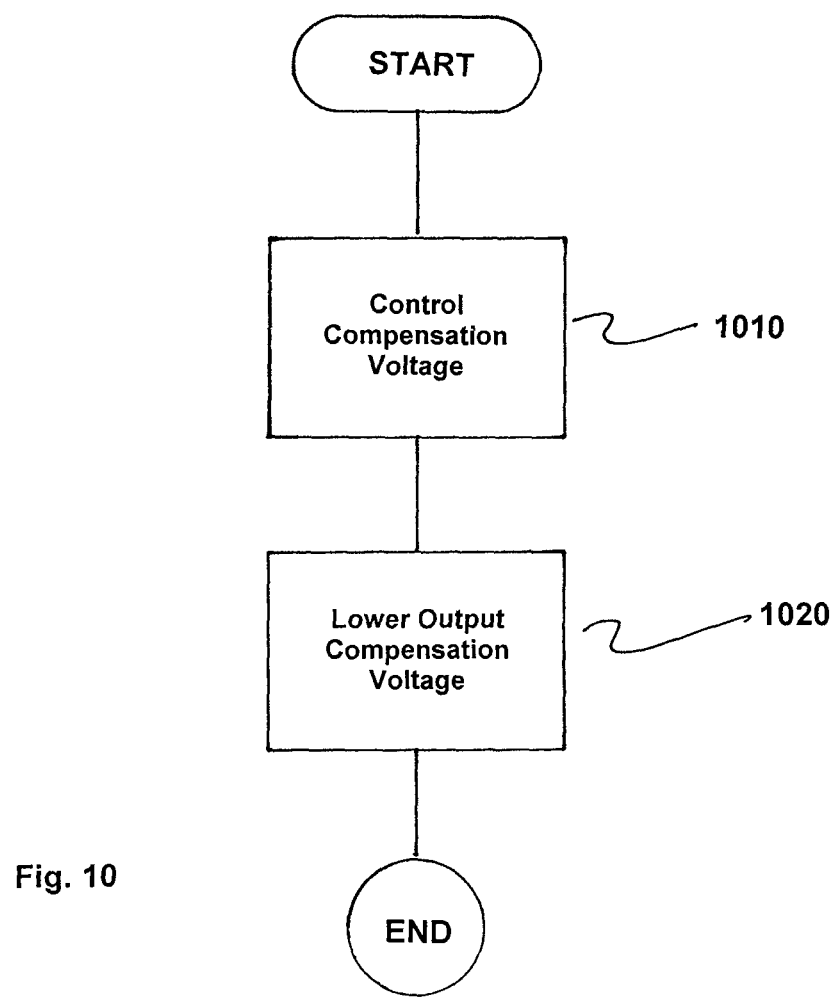
FIG. 10 is a flowchart of the method in accordance with the invention.

FIG. 10 is a flowchart of a method for operating a power supply. The method comprises controlling a DC compensation voltage of a measured charging current $I_L$ or discharging current of a rechargeable battery measured by a current measuring device to set the measured charging current $I_L$ or discharging current, as indicated in step 1010. The output compensation voltage is then lowered by a controller for a predetermined period of time, so that a load is supplied by the rechargeable battery for the predetermined period of time, as indicated in step 1020.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A power supply, comprising:
   a controller;
   a power element having a DC compensation voltage at a first output of the power element to which a load having a variable current draw is connectable;
   a current measurement device through which a second output of the power element is routed; and
   a rechargeable battery connected to the second output;
   wherein a charging current or discharging current of the rechargeable battery measured by the current measuring device is set by controlling the DC compensation voltage, said DC compensation voltage being raised to a voltage level which is above a level of an end-of-charge voltage level of the rechargeable battery to induce the charging current to compensate for a self-discharge of the rechargeable battery and being lowered below a level of the rechargeable battery voltage to induce the discharging current to discharge the rechargeable battery.

2. The power supply as claimed in claim 1, wherein the DC compensation voltage is fed through the current measuring apparatus to the second output.

3. The power supply as claimed in claim 1, further comprising:
   a first switch or a first diode;
   wherein the load is connected to the rechargeable battery by the first switch or the first diode.

4. The power supply as claimed in claim 2, further comprising:
   a first switch or a first diode;
   wherein the load is connected to the rechargeable battery by the first switch or the first diode.

5. The power supply as claimed in claim 4, wherein the switch comprises a power MOSFET.

6. The power supply as claimed in claim 1, wherein the current measuring device includes a shunt resistor and is connected to the controller.

7. The power supply as claimed in claim 1, wherein the current measurement device comprises a current converter and is connected to the controller.

8. The power supply as claimed in claim 4, further comprising:
   a second switch arranged in series with the rechargeable battery, the second switch being controlled by the controller to prevent a deep discharge of the rechargeable battery.

9. The power supply as claimed in claim 4, further comprising:
   a further switch or a second diode arranged in a charging current line of the rechargeable battery.

10. The power supply as claimed in claim 1, wherein the controller is a microcontroller for implementing control tasks.

11. A method for operating a power supply, comprising the steps of:
   controlling a DC compensation voltage of a measured charging current $I_l$ or discharging current of a rechargeable battery measured by a current measuring device to set the measured charging current or discharging current; and
   lowering the output compensation voltage by a controller for a predetermined period of time, so that a load is supplied by the rechargeable battery for the predetermined period of time;
   wherein said DC compensation voltage is raised to a voltage level which is above a level of an end-of-charge voltage level of the rechargeable battery to induce the charging current to compensate for a self-discharge of the rechargeable battery and is lowered below a level of the rechargeable battery voltage to induce the discharging current to discharge the rechargeable battery.

* * * * *